(12) United States Patent
Chiba (10) Patent No.: US 12,493,125 B2
(45) Date of Patent: Dec. 9, 2025

(54) SATELLITE SIGNAL RECEIVING DEVICE, SATELLITE SIGNAL PROCESSING DEVICE, CONTROL METHOD OF SATELLITE SIGNAL RECEIVING DEVICE, AND ELECTRONIC APPARATUS

(71) Applicant: SEIKO EPSON CORPORATION, Tokyo (JP)

(72) Inventor: Shigeto Chiba, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 207 days.

(21) Appl. No.: 18/170,877

(22) Filed: Feb. 17, 2023

(65) Prior Publication Data

US 2023/0266482 A1    Aug. 24, 2023

(30) Foreign Application Priority Data

Feb. 21, 2022   (JP) .................................. 2022-024984

(51) Int. Cl.
*G01S 19/42* (2010.01)
*G06F 1/12* (2006.01)

(52) U.S. Cl.
CPC .............. *G01S 19/425* (2013.01); *G06F 1/12* (2013.01)

(58) Field of Classification Search
CPC ........ G01S 19/425; G01S 19/33; G01S 19/35; G01S 19/34; G01S 19/13; G01S 19/36; G06F 1/12; Y02D 30/70
See application file for complete search history.

(56) References Cited

U.S. PATENT DOCUMENTS

| | | | |
|---|---|---|---|
| 2007/0105495 A1* | 5/2007 | Knight | G01S 19/32 455/12.1 |
| 2008/0181347 A1* | 7/2008 | Nakamura | H03L 7/1974 375/362 |
| 2009/0224974 A1 | 9/2009 | Lorenz | |
| 2013/0285854 A1 | 10/2013 | Gobara | |

(Continued)

FOREIGN PATENT DOCUMENTS

| | | | |
|---|---|---|---|
| CN | 102243313 A | * | 11/2011 |
| JP | 2000196519 A | * | 7/2000 |

(Continued)

*Primary Examiner* — Anne Marie Antonucci
*Assistant Examiner* — Jewel Ashley Kuntz
(74) *Attorney, Agent, or Firm* — Oliff PLC (57) ABSTRACT

A satellite signal receiving device includes a sampling clock outputting circuit that receives a reference clock and outputs a sampling clock, a first RF receiving circuit that is capable of performing intermittent driving in which an on operation and an off operation, and, during the on operation, down-converts a first satellite signal received by a first receiving antenna and outputs a first intermediate signal, a first baseband processing circuit that processes the first intermediate signal in accordance with the reference clock, a second RF receiving circuit that is capable of performing intermittent driving, and, during the on operation, down-converts a second satellite signal received by a second receiving antenna and outputs a second intermediate signal, and a second baseband processing circuit that processes the second intermediate signal in accordance with the sampling clock.

5 Claims, 8 Drawing Sheets

(56) References Cited

U.S. PATENT DOCUMENTS

2017/0279520 A1\* 9/2017 Kitazawa .......... H04B 7/18513
2019/0326915 A1\* 10/2019 Moslehi Bajestan ... H03L 7/099
2022/0026582 A1\* 1/2022 Kinoshita ............... G01S 5/011

FOREIGN PATENT DOCUMENTS

| JP | 2013-228250 A | 11/2013 |
| JP | 2017-173046 A | 9/2017 |

\* cited by examiner

SATELLITE SIGNAL RECEIVING DEVICE, SATELLITE SIGNAL PROCESSING DEVICE, CONTROL METHOD OF SATELLITE SIGNAL RECEIVING DEVICE, AND ELECTRONIC APPARATUS

The present application is based on, and claims priority from JP Application Serial Number 2022-024984, filed Feb. 21, 2022, the disclosure of which is hereby incorporated by reference herein in its entirety.

BACKGROUND

1. Technical Field

The present disclosure relates to, for example, a satellite signal receiving device, a satellite signal processing device, a control method of a satellite signal receiving device, and an electronic apparatus.

2. Related Art

As a positioning system, Global Positioning System (GPS) is widely known. In most cases, the system is incorporated in a mobile or small-sized electronic apparatus operated by a battery, and hence low power consumption is required. Thus, there has been proposed a technology for suppressing power consumption by intermittently driving an RF receiving circuit that receives a satellite signal and a baseband processing circuit that processes the satellite signal received by the RF receiving circuit (for example, see description in JP-A-2013-228250).

The positioning system is often referred to as a collective name, that is, Global Navigation Satellite System (GNSS). GPS described above is also a type of GNSS, and Beidou, GLONASS, GALILEO, and the like are also known.

In recent years, there has been proposed a satellite signal receiving device that supports so-called multi-GNSS using a plurality of types of GNSS in combination (for example, see description in JP-A-2017-173046, particularly FIG. 7).

According to the satellite signal receiving device supporting multi-GNSS, which is described in JP-A-2017-173046, signals can be acquired from a greater number of satellites, and performance improvement such as improvement of positioning accuracy and expansion of a positionable area is expected. However, there also arises a problem of increase of power consumption.

SUMMARY

A satellite signal receiving device according to one aspect of the present disclosure includes a first receiving channel configured to process a first satellite signal of a first GNSS, a second receiving channel configured to process a second satellite signal of a second GNSS, and a sampling clock outputting circuit configured to receive a reference clock and output a sampling clock, wherein the first receiving channel includes a first RF receiving circuit configured to perform intermittent driving in which an on operation and an off operation are repeated, and, during the on operation, down-convert the first satellite signal received by a first receiving antenna and output a first intermediate signal, and a first baseband processing circuit configured to process the first intermediate signal in accordance with the reference clock, and the second receiving channel includes a second RF receiving circuit configured to perform the intermittent driving, and, during the on operation, down-convert the second satellite signal received by a second receiving antenna and output a second intermediate signal, and a second baseband processing circuit configured to process the second intermediate signal in accordance with the sampling clock.

DESCRIPTION OF EXEMPLARY EMBODIMENTS

With reference to the drawings, a satellite signal receiving device according to an exemplary embodiment of the present disclosure is described below.

Note that the embodiment described below is a suitable specific example, and various technically preferable limitations are applied, but the scope of the present disclosure is not limited to these modes unless they are specifically described in the following description as limiting the present disclosure.

Figure 1:
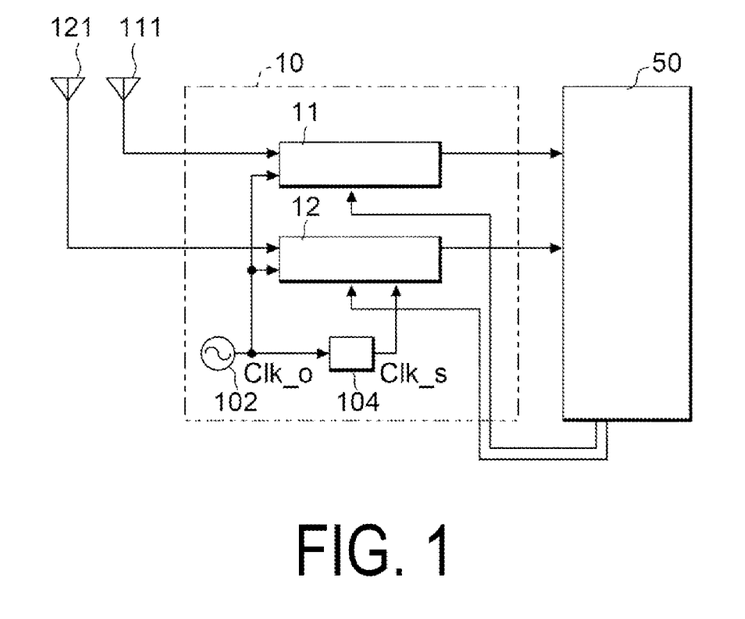
FIG. 1 is a diagram illustrating a schematic configuration of a satellite signal receiving device according an exemplary embodiment.

FIG. 1 is a diagram illustrating a configuration including a satellite signal receiving device 10 according to the exemplary embodiment, a control circuit 50, a first receiving antenna 111, and a second receiving antenna 121. The satellite signal receiving device 10 illustrated in this diagram is a multi-GNSS-supporting receiver capable of performing positioning through use of a plurality of satellite positioning systems.

As illustrated in the drawing, the satellite signal receiving device 10 includes a first receiving channel 11, a second receiving channel 12, an oscillating circuit 102, and a sampling block outputting circuit 104.

The oscillating circuit 102 generates a reference clock Clk_o, and supplies the reference clock Clk_o to the first receiving channel 11, the second receiving channel 12, and the sampling block outputting circuit 104. As the oscillating circuit 102, a temperature compensation crystal oscillator is suitably used. The temperature compensation crystal oscillator incorporates a compensation circuit having characteristics opposite to temperature characteristics of a crystal oscillating element and has satisfactory frequency characteristics of the reference clock Clk_o within a wide temperature range.

The first receiving antenna 111 receives a first satellite signal, for example, a GPS satellite signal, among a plurality of satellite positioning systems that can be utilized by the satellite signal receiving device 10. The second receiving antenna 121 receives a second satellite signal different from the first satellite signal, for example, a GLONASS satellite signal, among the plurality of satellite positioning systems that can be utilized by the satellite signal receiving device 10.

The sampling block outputting circuit 104 receives the reference clock Clk_o, generates a sampling clock Clk_s based on the reference clock Clk_o, and supplies the sampling clock Clk_s to the second receiving channel 12. Note that the sampling block outputting circuit 104 is, for example, a Phase Locked Loop (PLL) circuit that outputs the sampling clock Clk_s in synchronization with a phase of the reference clock Clk_o, which is described later in detail.

The first receiving channel 11 digitalizes the first satellite signal by down-converting a frequency of the first satellite signal received by the first receiving antenna 111 into an intermediate frequency, stores the digitalized signal the digitalized signal in a memory, and executes processing. Note that the first receiving channel 11 receives the reference clock Clk_o, and executes conversion to the intermediate frequency and processing of the digitalized signal, based on the reference clock Clk_o.

Further, some elements of the first receiving channel 11 are controlled by the control circuit 50 in a normal driving manner or an intermittent driving manner. Note that normal driving is a mode in which power is always supplied to perform an on operation, and intermittent driving is a mode for reducing power consumption in which an on operation for supplying power and an off operation for shutting off power are repeated alternatingly.

The second receiving channel 12 digitalizes the second satellite signal by down-converting a frequency of the second satellite signal received by the second receiving antenna 121 into an intermediate frequency, stores the digitalized signal the digitalized signal in a memory, and executes processing. Note that the second receiving channel 12 receives the reference clock Clk_o, and executes conversion to the intermediate frequency based on the reference clock Clk_o, and executes processing of the digitalized signal based on the sampling clock Clk_s.

Further, some elements of the second receiving channel 12 are controlled by the control circuit 50 in a normal driving manner or an intermittent driving manner.

The control circuit 50 causes a display device, which is omitted in illustration, to perform display or corrects an internal clock through use of a current position and a time, based on the processing result of the first receiving channel 11 and/or the second receiving channel 12.

Further, the control circuit 50 controls driving of the first receiving channel 11 based on the processing result of the first receiving channel 11, specifically, in accordance with a reception state or the like of the first satellite signal at the first receiving antenna 111, and controls driving of the second receiving channel 12 based on the processing result of the second receiving channel 12, specifically, in accordance with a reception state or the like of the second satellite signal at the second receiving antenna 121.

For example, when a reception state at the first receiving antenna 111 is satisfactory, the control circuit 50 is capable of acquiring sufficient position information or the like only from the first satellite signal, and hence some elements of the second receiving channel 12 is intermittently driven or is in the off operation. Further, for example, when a reception state at the first receiving antenna 111 is not satisfactory, or reception cannot be performed, the control circuit 50 turns some elements of the first receiving channel 11 in an intermittent driving state or in the off operation, and turns the second receiving channel 12 in a normal driving state and attempts to acquire position information or the like from the second satellite signal.

Figure 2:
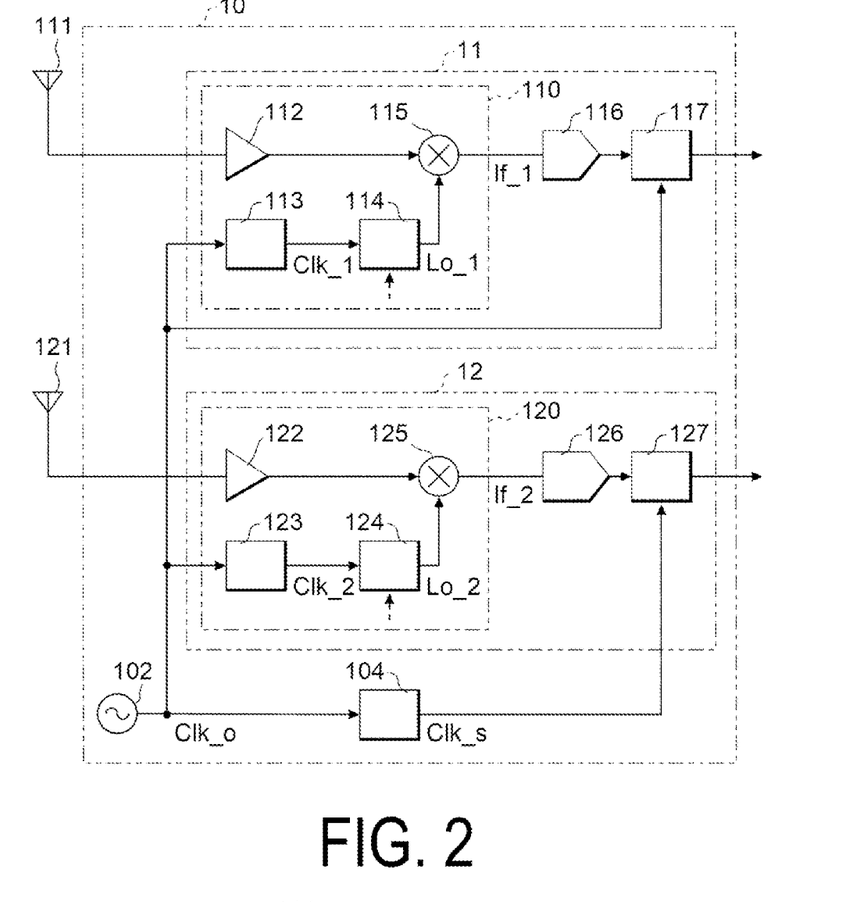
FIG. 2 is a diagram illustrating a configuration of the satellite signal receiving device.

FIG. 2 is a block diagram illustrating a configuration of the satellite signal receiving device 10, particularly a configuration of the first receiving channel 11 and the second receiving channel 12.

As illustrated in this drawing, the first receiving channel 11 includes a first RF receiving circuit 110, an AD converting circuit 116, and a first baseband processing circuit 117. The first RF receiving circuit 110 includes an amplifying circuit 112, a first dividing circuit 113, a first PLL circuit 114, and a first mixing circuit 115.

The first dividing circuit 113 divides the reference clock Clk_o, and outputs a signal obtained through division as a first clock Clk_1.

The first PLL circuit 114 outputs a first local signal Lo_1 in synchronization with a phase of the first clock Clk_1. When the control circuit 50 designates the on operation, each of the elements of the first PLL circuit 114 is operated. When the off operation is designated, power is shut off, and the operation is stopped.

The amplifying circuit 112 amplifies the first satellite signal received by the first receiving antenna 111. The first mixing circuit 115 executes down-conversion to an intermediate frequency by mixing (multiplying) an output signal from the amplifying circuit 112 and the first local signal Lo_1 from the first PLL circuit 114, and outputs a resultant signal as a first intermediate signal If_1.

The AD converting circuit 116 converts the first intermediate signal If_1 being analog, into a digital signal. The first baseband processing circuit 117 is a baseband processing unit that executes processing through use of the reference clock Clk_o. Specifically, the first baseband processing circuit 117 stores the first intermediate signal If_1 being digitalized in a memory by a predetermined capacity, generates a replica code that is associated with a type of GNSS corresponding to the first satellite signal and a satellite being a reception target, and executes correlation processing between the first intermediate signal If_1 stored in the memory and the generated replica code.

Similarly to the first receiving channel 11, the second receiving channel 12 includes a second RF receiving circuit 120, an AT converting circuit 126, and a second baseband processing circuit 127, and the second RF receiving circuit 120 includes an amplifying circuit 122, a second dividing circuit 123, a second PLL circuit 124, and a second mixing circuit 125.

The second dividing circuit 123 divides the reference clock Clk_o, and outputs a signal obtained through division as a second clock Clk_2. The second PLL circuit 124 outputs the second local signal Lo_2 in synchronization with a phase of a second clock Clk_2.

When the control circuit 50 designates the on operation, each of the elements of the second PLL circuit 124 is operated. When the off operation is designated, power is shut off, and the operation is stopped.

The amplifying circuit 122 amplifies the second satellite signal received by the second receiving antenna 121. The second mixing circuit 125 executes down-conversion to an intermediate frequency by mixing (multiplying) an output signal from the amplifying circuit 122 and the second local signal Lo_2 from the second PLL circuit 124, and outputs a resultant signal as a second intermediate signal If_2.

The AT converting circuit 126 converts the second intermediate signal If_2 being analog, into a digital signal. The second baseband processing circuit 127 is a baseband processing unit that executes processing through use of the sampling clock Clk_s. The second baseband processing circuit 127 stores the second intermediate signal If_2 being digitalized in a memory by a predetermined capacity, generates a replica code that is associated with a type of GNSS corresponding to the second satellite signal and a satellite being a reception target, and executes correlation processing between the second intermediate signal If_2 stored in the memory and the generated replica code.

A control circuit 50 controls driving of the first PLL circuit 114 of the first receiving channel 11 and/or the second PLL circuit 124 of the second receiving channel 12, in accordance with a reception state of the first satellite signal obtained at the time of correlation processing executed by the first baseband processing circuit 117 and/or a reception state of the second satellite signal obtained at the time of correlation processing executed by the second baseband processing circuit 127.

Figure 3:
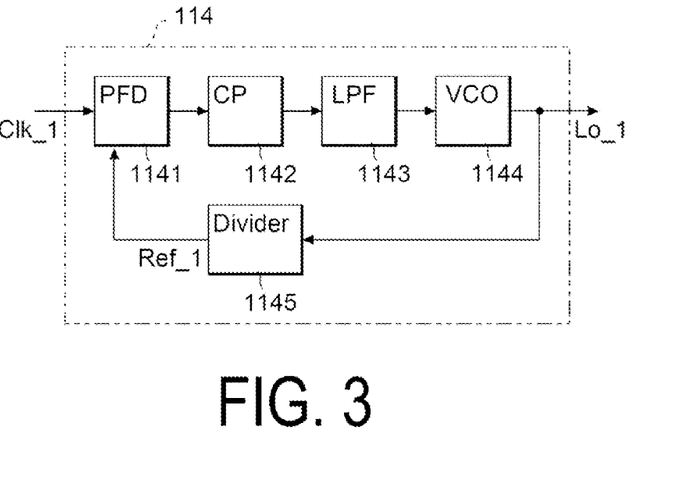
FIG. 3 is a diagram illustrating a configuration of a first PLL circuit of a first RF receiving circuit.

FIG. 3 is a block diagram illustrating a configuration of the first PLL circuit 114. As illustrated in this drawing, the first PLL circuit 114 includes a phase frequency comparing circuit (Phase Frequency Detector, PFD) 1141, a charge pump (Charge Pump, CP) circuit 1142, a low pass filter (Low Pass Filter, LPF) 1143, a voltage control-type oscillating circuit (Voltage Controlled Oscillator, VCO) 1144, and a dividing circuit (divider) 1145.

The phase frequency comparing circuit 1141 compares the phase of the first clock Clk_1 and a phase of a first reference signal Ref_1 output from the dividing circuit 1145 with each other, and outputs a voltage pulse signal corresponding to phase divergence. The charge pump circuit 1142 converts a voltage of a pulse signal output from the phase frequency comparing circuit 1141, into a current. The low pass filter 1143 converts the current output from the charge pump circuit 1142, into a voltage, and also performs smoothing. The voltage control-type oscillating circuit 1144 generates a signal having a frequency corresponding to the voltage output from the low pass filter 1143, and outputs the signal as the first local signal Lo_1. The dividing circuit 1145 divides the first local signal Lo_1, and returns a resultant signal as the first reference signal Ref_1 to the phase frequency comparing circuit 1141.

Therefore, in the first PLL circuit 114, oscillation of the voltage control-type oscillating circuit 1144 is controlled so that a frequency difference between the first clock Clk_1 and the first reference signal Ref_1 is eliminated. Thus, the frequency of the first local signal Lo_1 is obtained through multiplication of the frequency of the first clock Clk_1, and the first local signal Lo_1 is in synchronization with the first clock Clk_1 and is output.

Figure 4:
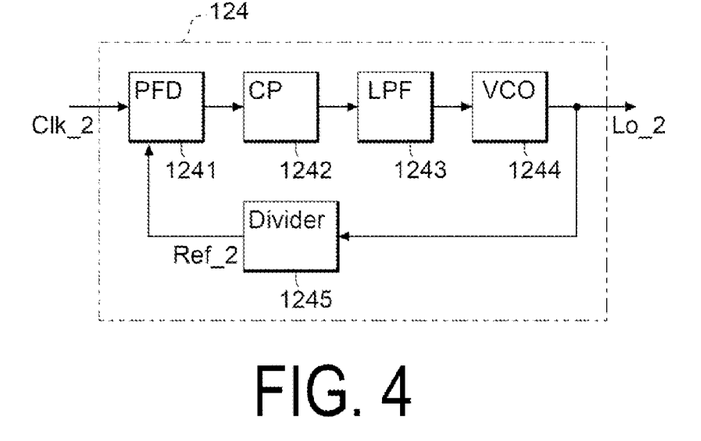
FIG. 4 is a diagram illustrating a configuration of a second PLL circuit of a second RF receiving circuit.

FIG. 4 is a block diagram illustrating a configuration of the second PLL circuit 124. As illustrated in this drawing, similarly to the first PLL circuit 114, the second PLL circuit 124 includes a phase frequency comparing circuit 1241, a charge pump circuit 1242, a low pass filter 1243, a voltage control-type oscillating circuit 1244, and a dividing circuit 1245.

Thus, in the second PLL circuit 124, oscillation of the voltage control-type oscillating circuit 1244 is controlled so that a frequency difference between the second clock Clk_2 and a second reference signal Ref_2 output from the dividing circuit 1245 is eliminated. With this, the frequency of the second local signal Lo_2 output from the voltage control-type oscillating circuit 1244 is obtained through multiplication of the frequency of the second clock Clk_2, and the second local signal Lo_2 is in synchronization with the second clock Clk_2 and is output.

Figure 5:
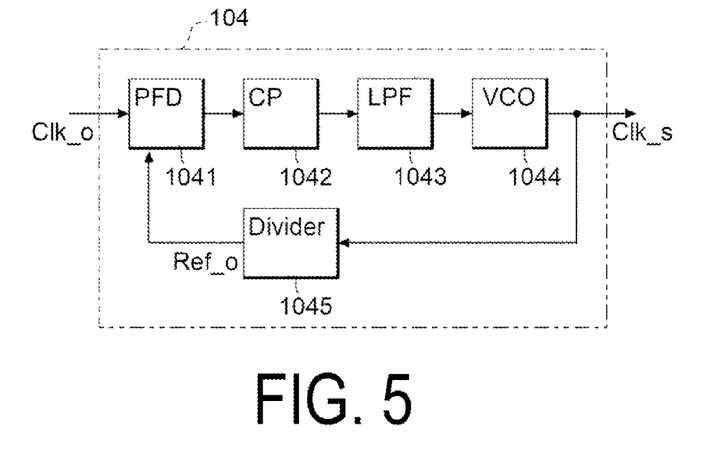
FIG. 5 is a diagram illustrating a configuration of a sampling clock outputting circuit of the satellite signal receiving device.

FIG. 5 is a block diagram illustrating a configuration of the sampling block outputting circuit 104. As illustrated in this drawing, similarly to the first PLL circuit 114, the sampling block outputting circuit 104 also includes a phase frequency comparing circuit 1041, a charge pump circuit 1042, a low pass filter 1043, a voltage control-type oscillating circuit 1044, and a dividing circuit 1045.

Thus, in the sampling block outputting circuit 104, oscillation of the voltage control-type oscillating circuit 1044 is controlled so that a frequency difference between the reference clock Clk_o and a reference signal Ref_o output from the dividing circuit 1045 is eliminated. With this, the frequency of the sampling clock Clk_s output from the voltage control-type oscillating circuit 1044 is obtained through multiplication of the frequency of the reference clock Clk_o, and the sampling clock Clk_s is in synchronization with the reference clock Clk_o and is output.

Figure 6:
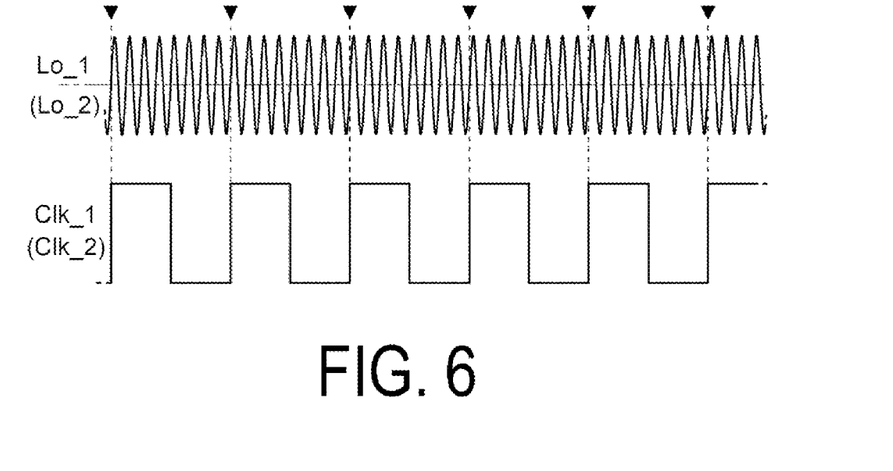
FIG. 6 is a diagram illustrating an operation of the satellite signal receiving device according the exemplary embodiment.
Figure 7:
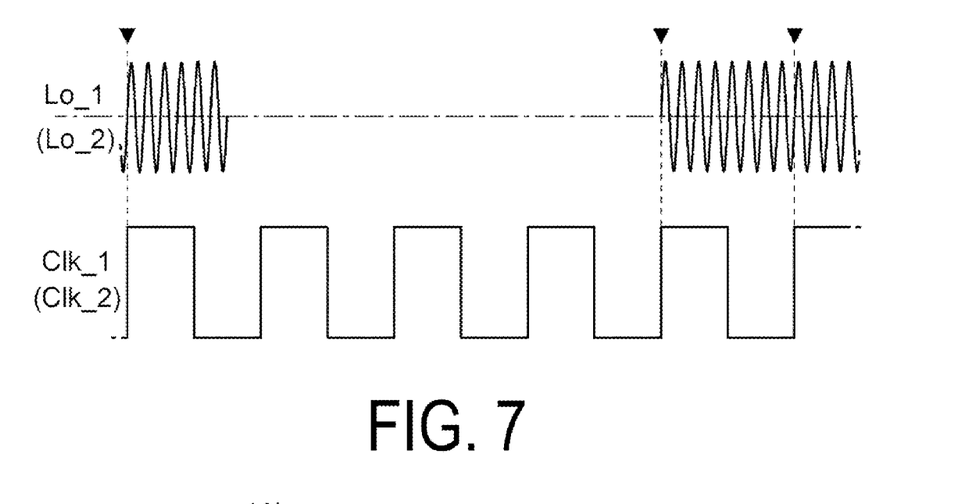
FIG. 7 is a diagram illustrating an operation of the satellite signal receiving device according the exemplary embodiment.

FIG. 6 and FIG. 7 are diagrams illustrating a relationship between the first clock Clk_1 being an input and the first local signal Lo_1 being an output in the first PLL circuit 114.

FIG. 6 illustrates a relationship between the first clock Clk_1 and the first local signal Lo_1 during normal driving or while the on operation is continued. As illustrated in this diagram, during normal driving, the first local signal Lo_1 is supplied in synchronization with the first clock Clk_1.

FIG. 7 illustrates a relationship between the first clock Clk_1 and the first local signal Lo_1 during intermittent driving in which the on operation and the off operation are repeated. As illustrated in this diagram, during normal driving, the first local signal Lo_1 is supplied in synchronization with the first clock Clk_1.

Note that a downward triangle mark in FIG. 6 and FIG. 7 indicates timing at which the first clock Clk_1 rises from an L level to an H level when the on operation is designated to the first PLL circuit 114 during normal driving or intermittent driving. In other words, the triangle mark is a mark for describing synchronization of the first local signal Lo_1 with the first clock Clk_1.

Further, in the second PLL circuit 124, a relationship between the second clock Clk_2 being an input and the second local signal Lo_2 being an output is also similar to FIG. 6 and
FIG. 7.

In general, the first dividing circuit 113, the second dividing circuit 123, and the dividing circuits including the dividing circuits 1045, 1145, and 1245 are configured by coupling a plurality of counters in a cascade manner. In this configuration, in the dividing circuit, a signal such as a clock is input, and then a signal obtained by delaying the input signal for a plurality of cycles is output as a division signal. Thus, in the dividing circuit, even when the processing proceeds from the off operation to the on operation, a signal obtained through division after input of a signal such as a clock cannot immediately be output.

In the present exemplary embodiment, even in the off operation during intermittent driving, power of the first dividing circuit 113 and the second dividing circuit 123 is not shut off, and hence a dividing operation can continuously be executed. Thus, even when the first PLL circuit 114 is in the off operation, the first clock Clk_1 is continuously output from the first dividing circuit 113. Similarly, even when the second PLL circuit 124 is in the off operation, the second clock Clk_2 is continuously output from the second dividing circuit 123.

Meanwhile, when the dividing circuit 1045 included in the first PLL circuit 114 is in the off operation, power is shut off, and hence a dividing operation is interrupted. Thus, even when the processing proceeds from the off operation to the on operation, the first reference signal Ref_1 being a divided clock is not immediately output. Similarly, when the dividing circuit 1245 included in the second PLL circuit 124 is in the off operation, power is shut off, and hence a dividing operation is interrupted. Thus, even when the processing proceeds from the off operation to the on operation, the second reference signal Ref_2 being a clock obtained through division is not immediately output.

However, directly after the processing proceeds from the off operation to the on operation, the phase frequency comparing circuit 1141 outputs a voltage pulse signal corresponding to phase divergence between the phase of the first clock Clk_1 that is continuously output even in the off operation and the phase of the first reference signal Ref_1 that is not immediately output. Thus, as illustrated in FIG. 7, in the first PLL circuit 114, even when the processing proceeds from the off operation to the on operation, the first local signal Lo_1 based on the pulse signal is immediately output in synchronization with the first clock Clk_1, specifically, the rising timing of the first clock Clk_1.

Similarly, in the second PLL circuit 124, even after the processing proceeds from the off operation to the on operation, the second local signal Lo_2 is immediately output in synchronization with the rising timing of the second clock Clk_2.

The sampling block outputting circuit 104 is a PLL circuit similar to the first PLL circuit 114 and the second PLL circuit 124, but is not in the off operation because power is always supplied thereto. Therefore, regardless of the operation mode, the sampling clock Clk_s is always output.

Note that the frequency of the sampling clock Clk_s is approximately 1/10 of the frequency of the reference clock Clk_o. Power that is consumed by normally driving the sampling block outputting circuit 104 is negligibly small as compared to a power consumption amount that can be suppressed by intermittently driving the first PLL circuit 114 and the second PLL circuit 124.

In this manner, in the present exemplary embodiment, intermittent driving of the first PLL circuit 114 of the first receiving channel 11 and the second PLL circuit 124 of the second receiving channel 12 enable suppression of power consumption. Further, during intermittent driving, the local signal is immediately output when the processing proceeds from the off operation to the on operation. Thus, delay at the first baseband processing circuit 117 and the second baseband processing circuit 127 can be suppressed.

Next, superiority of the present exemplary embodiment over comparative examples is described.

Figure 8:
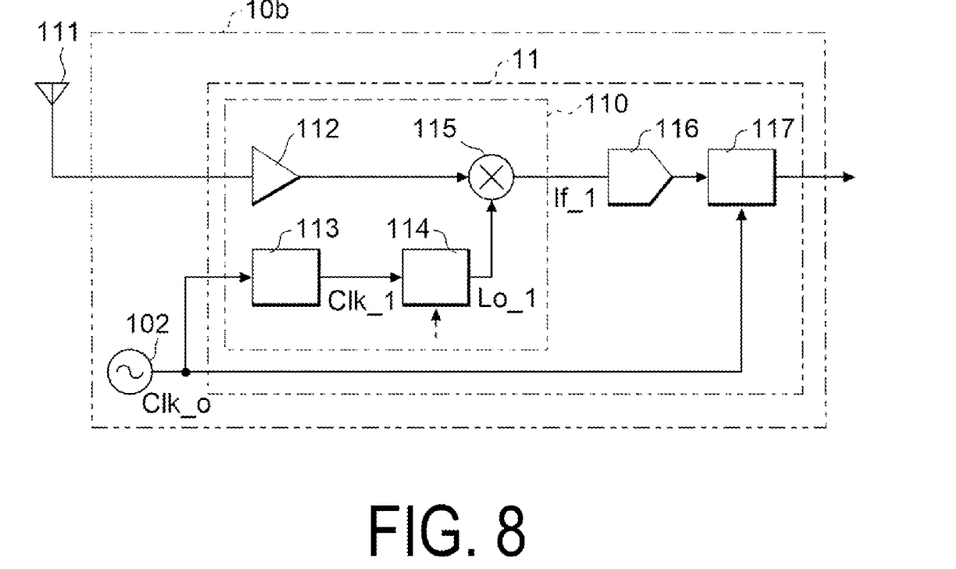
FIG. 8 is a diagram illustrating a configuration of an RF receiving circuit of a satellite signal receiving device in a first comparative example.

FIG. 8 is a diagram illustrating a configuration of a satellite signal receiving device 10b in a first comparative example. The satellite signal receiving device 10b includes the first receiving channel 11 capable of performing intermittent driving, but supports only one GNSS.

Figure 9:
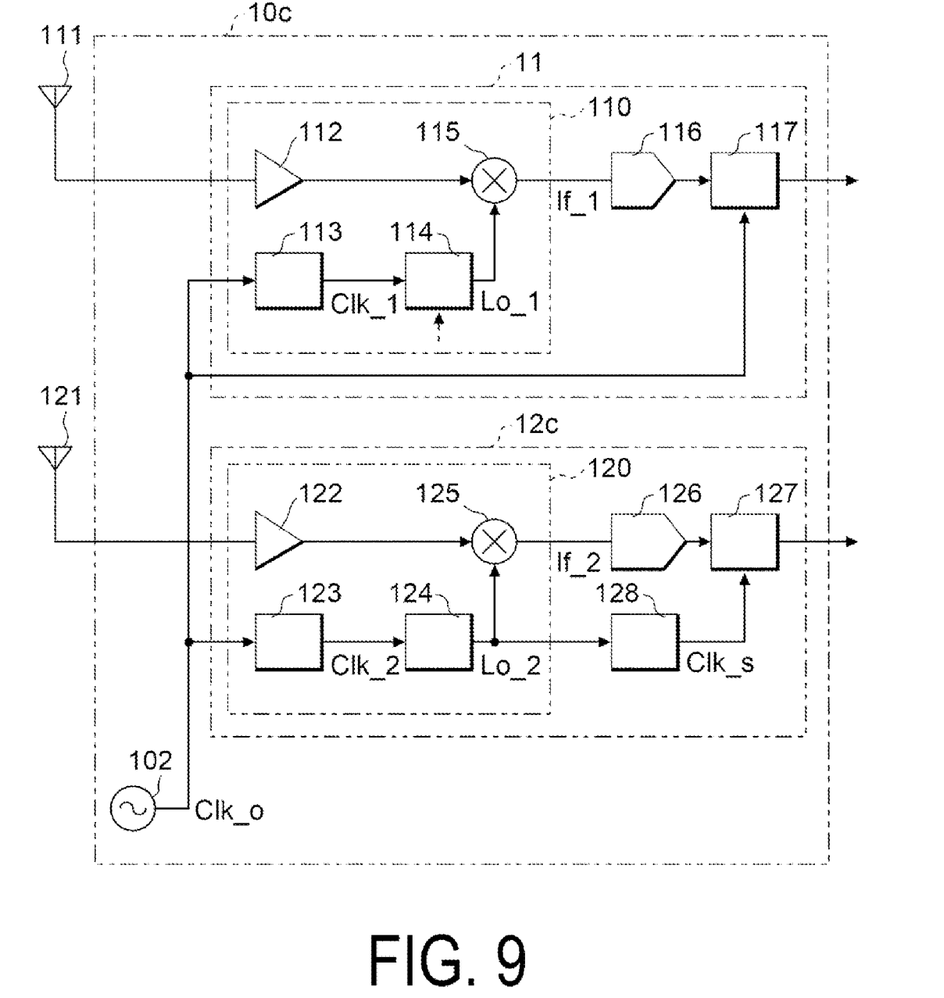
FIG. 9 is a diagram illustrating a configuration of an RF receiving circuit of a satellite signal receiving device in a second comparative example.

FIG. 9 is a diagram illustrating a configuration of a satellite signal receiving device 10c in a second comparative example. The second comparative example is similar to the exemplary embodiment and the first example embodiment in that the first receiving channel 11 supporting the first GNSS is included, and is similar to the exemplary embodiment but different from the first comparative example in that a second receiving channel 12c supporting the second GNSS is included.

In the second comparative example, the second receiving channel 12c has a configuration in which, a dividing circuit 128 divides the second local signal Lo_2 from the second PLL circuit 124 and a signal obtained through division is output as the sampling clock Clk_s.

In this configuration, in the second receiving channel 12c, when the second PLL circuit 124 is in the off operation, the second local signal Lo_2 is not output. Thus, even when the processing proceeds from the off operation to the on operation, the dividing circuit 128 cannot immediately output the sampling clock Clk_s, and hence the second receiving channel 12c is not suitable for intermittent driving.

In contrast, in the exemplary embodiment, both the first receiving channel 11 and the second receiving channel 12 can be intermittently driven. Thus, during intermittent driving, the local signal is immediately output when the processing proceeds from the off operation to the on operation.

Note that, in the exemplary embodiment, GPS is exemplified as the first GNSS, and GLONASS is exemplified as the second GNSS. The exemplary embodiment is applicable to other satellite positioning systems such as Galileo and Beidou. Further, for example, a third receiving channel may be provided, and there may be adopted a configuration in which a third intermediate signal that is obtained by down-converting a third satellite signal to an intermediate frequency is subjected to processing through use of a sampling clock being a signal obtained when an additionally-provided dividing circuit divides the reference clock Clk_o. In this manner, the number of receiving channels is only required to be two or more.

Figure 10:
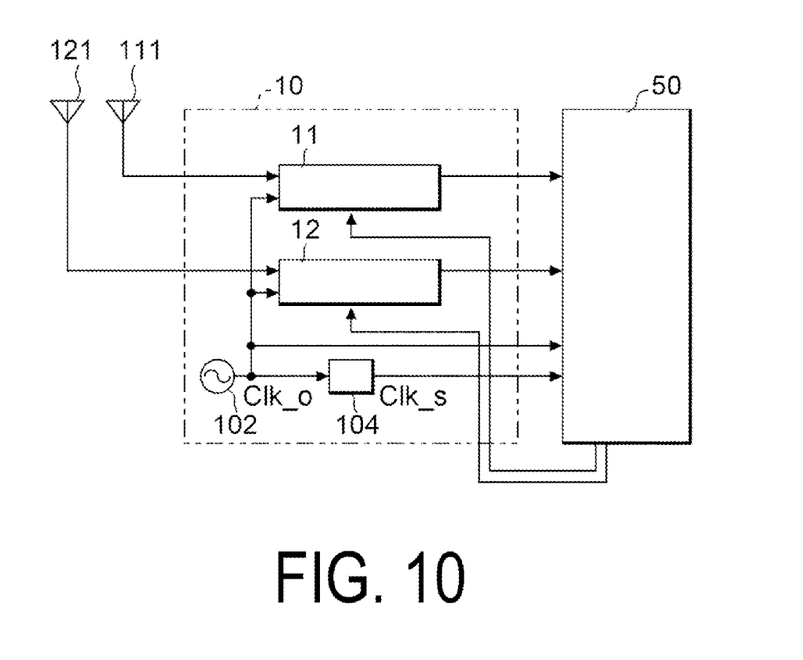
FIG. 10 is a diagram illustrating a schematic configuration of a satellite signal processing device in a modified example.
Figure 11:
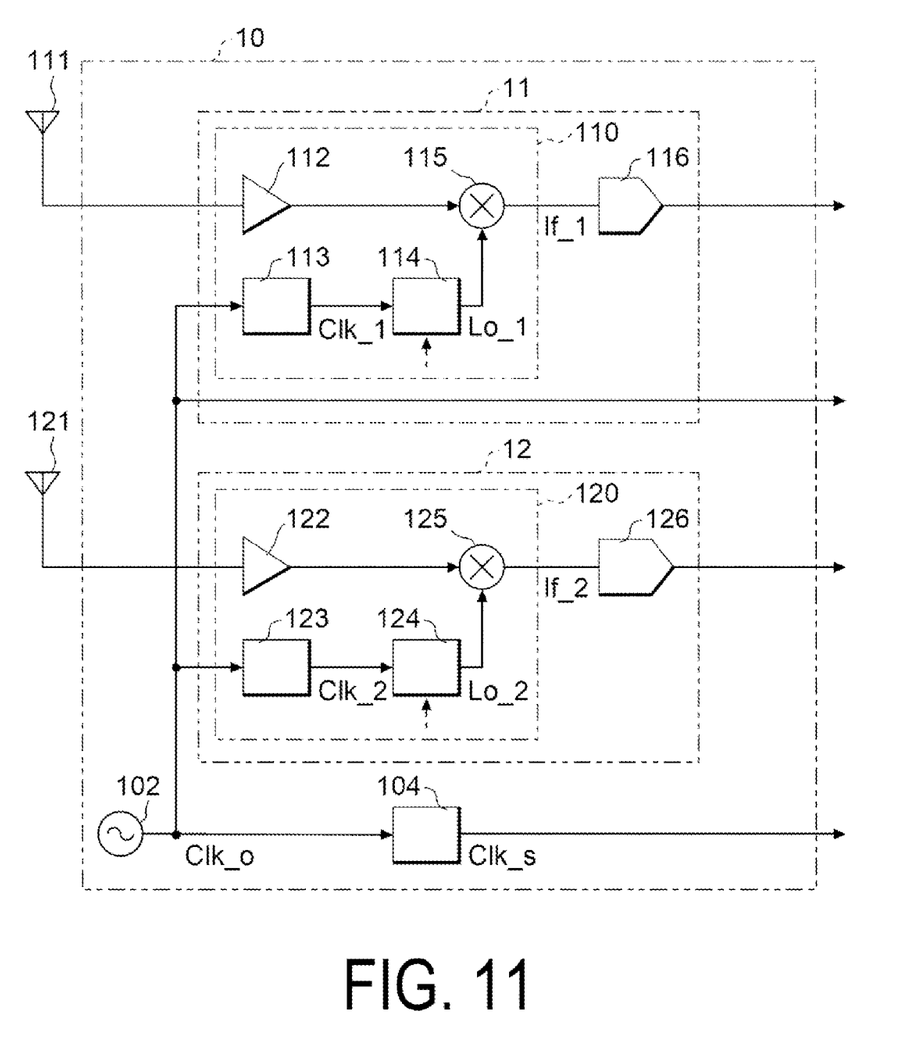
FIG. 11 is a diagram illustrating a configuration of the satellite signal processing device in the modified example.

FIG. 1 and FIG. 2 illustrate the configuration in which the satellite signal receiving device 10 includes the first baseband processing circuit 117 and the second baseband processing circuit 127. The configuration is not limited thereto, and is only required to be a configuration in which, during intermittent driving, the reference clock Clk_o is input to the RF reception units of the first RF receiving circuit 110 and the second RF receiving circuit 120 and the sampling clock corresponding to the reference clock Clk_o is input to the first baseband processing circuit 117 and the second baseband processing circuit 127. For example, as illustrated in FIG. 10 and FIG. 11, a control unit 50 that controls intermittent driving of the first RF receiving circuit 110 and the second RF receiving circuit 120 may include the first baseband processing circuit 117 and the second baseband processing circuit 127, and a satellite signal processing device may be conceptualized while including the satellite signal receiving device 10 and the control unit 50. Note that the reference clock Clk_o and the sampling clock Clk_s are input to the control unit 50.

Next, an electronic apparatus including the satellite signal receiving device 10 according to the exemplary embodiment is described.

Figure 12:
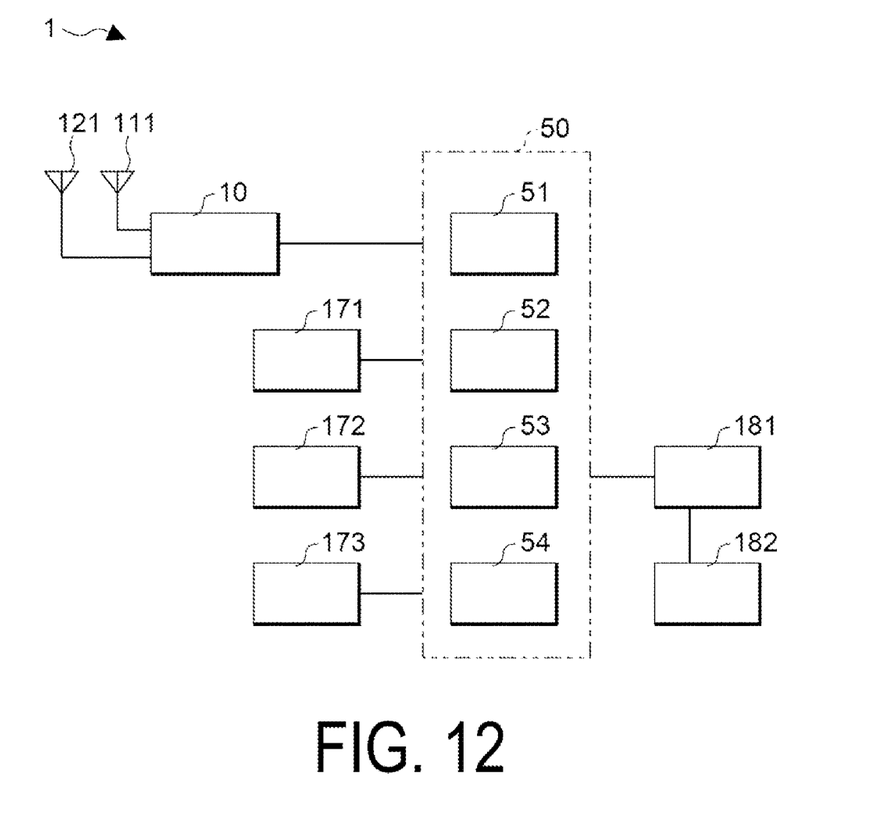
FIG. 12 is a diagram illustrating a configuration of an electronic apparatus including the satellite signal receiving device.

FIG. 12 is a block diagram illustrating a circuit configuration of an electronic clock 1 being an example of the electronic apparatus.

The electronic clock 1 includes a clock device 171, a storage device 172, an input device 173, a driving mechanism 181, and a display device 182, in addition to the satellite signal receiving device 10 according to the exemplary embodiment, the control circuit 50, the first receiving antenna 111, and the second receiving antenna 121.

The control circuit 50 of the electronic clock 1 is a processor such as a Central Processing Unit (CPU), and establishes the following functions by executing various programs stored in the storage device 172 in addition to the function of controlling intermittent driving of the first receiving channel 11 and the second receiving channel 12 in the satellite signal receiving device 10.

Specifically, the control circuit 50 establishes a time zone set unit 52, a time correction unit 53, and a display control unit 54, in addition to a reception control unit 51 having the function of controlling intermittent driving of the first receiving channel 11 and the second receiving channel 12 in the satellite signal receiving device 10.

The time zone set unit 52 sets time zone data based on position information that is acquired based on the processing result of the satellite signal receiving device 10. The time correction unit 53 corrects time data based on time information that is acquired based on the processing result of the satellite signal receiving device 10 and the time zone data set by the time zone set unit 52. The display control unit 54 controls an operation of the driving mechanism 181, and controls a display content of the display device 182.

The clock device 171 includes, for example, a crystal oscillating element, and updates the time data through use of a reference signal based on an oscillation signal of the crystal oscillating element. The input device 173 is an operation piece such as a button and a crown. An operation signal generated by operating the operation piece is supplied to the control circuit 50.

Note that the electronic apparatus including the satellite signal receiving device 10 is described here, but an electronic apparatus including the satellite signal processing device illustrated in FIG. 10 and FIG. 11 may also be achieved.

Description is made on the electronic clock 1 as an example of the electronic apparatus. The electronic apparatus is not limited to the electronic clock 1, and examples of the electronic clock include a wearable terminal, a smartphone, a tablet terminal, a mobile navigation device, a car navigation device, and a personal computer.

Supplementary Notes

Preferred aspects of the present disclosure are understood from the above description, as follows. In the following, in order to facilitate understanding of each of the aspects, the reference signs of the drawings are provided in parentheses for convenience, but the present disclosure is not intended to be limited to the illustrated aspects.

Supplementary Note 1

A satellite signal receiving device (10) according to an aspect (first aspect) includes a first receiving channel (11) configured to process a first satellite signal of a first GNSS, a second receiving channel (12) configured to process a second satellite signal of a second GNSS, and a sampling clock outputting circuit (104) configured to receive a reference clock (Clk_o) and output a sampling clock (Clk_s), wherein the first receiving channel (11) includes a first RF receiving circuit (110) configured to perform intermittent driving in which an on operation and an off operation are repeated, and, during the on operation, down-convert the first satellite signal received by a first receiving antenna (111) and output a first intermediate signal (If_1), and a first baseband processing circuit (117) configured to process the first intermediate signal (If_1) in accordance with the reference clock (Clk_o), and the second receiving channel (12) includes a second RF receiving circuit (120) configured to perform the intermittent driving, and, during the on operation, down-convert the second satellite signal received by a second receiving antenna (121) and output a second intermediate signal (If_2), and a second baseband processing circuit (127) configured to process the second intermediate signal (If_2) in accordance with the sampling clock (Clk_s).

According to the first aspect, even when the first RF receiving circuit (110) and the second RF receiving circuit (120) are in the off operation, the reference clock (Clk_o) and the sampling clock (Clk_s) are not stopped. Thus, intermittent driving can be executed appropriately.

Supplementary Note 2

Specifically, in the satellite signal receiving device (10) according to a second aspect in the first aspect, the first RF receiving circuit (110) includes a first dividing circuit (113) configured to output a first clock (Clk_1) acquired by dividing the reference clock (Clk_o), a first PLL circuit (114) configured to output a first local signal (Lo_1) in synchronization with a phase of the first clock (Clk_1), and a first mixing circuit (115) configured to mix a signal based on the first satellite signal received and the first local signal (Lo_1) and output a resultant signal as the first intermediate signal (If_1), and the second RF receiving circuit (120) includes a second dividing circuit (123) configured to output a second clock (Clk_2) acquired by dividing the reference clock (Clk_o), a second PLL circuit (124) configured to output a second local signal (If_2) in synchronization with a phase of the second clock (Clk_2), and a second mixing circuit (125) configured to mix a signal based on the second satellite signal received and the second local signal (If_2) and output a resultant signal as the second intermediate signal (Lo_2).

According to the second aspect, the first RF receiving circuit (110) and the second RF receiving circuit (120) are configured in a specific manner.

Supplementary Note 3

Specifically, in the satellite signal receiving device (10) according to a third aspect in the second aspect, when the first RF receiving circuit (110) is in the off operation, power of the first PLL circuit (114) is shut off, and when the second RF receiving circuit (120) is in the off operation, power of the second PLL circuit (124) is shut off.

According to the third aspect, when the first RF receiving circuit (110) is in the off operation, power of the first PLL circuit (114) is shut off, and hence power consumption can be suppressed. When the second RF receiving circuit (120) is in the off operation, power of the second PLL circuit (124) is shut off, and hence power consumption can be suppressed.

Supplementary Note 4

Specifically, in the satellite signal receiving device (10) according to a fourth aspect in the third aspect, even when the first RF receiving circuit (110) is in the off operation, power of the first dividing circuit (113) is not shut off, and even when the second RF receiving circuit (120) is in the off operation, power of the second dividing circuit (123) is not shut off.

According to the fourth aspect, even when the first RF receiving circuit (110) is in the off operation, power of the first dividing circuit (113) is not shut off, and hence the first clock (Clk_1) is output. Even when the second RF receiving circuit (120) is in the off operation, power of the second dividing circuit (123) is not shut off, and hence the second clock (Clk_2) is output. Thus, when the processing proceeds from the off operation to the on operation, the intermediate signal is immediately output.

Supplementary Note 5

A satellite signal receiving device (10) according to another aspect (fifth aspect) includes a sampling clock outputting circuit (104) configured to receive the reference clock (Clk_o) and output the sampling clock (Clk_s), a first RF receiving circuit (110) configured to receive the reference clock (Clk_o), and down-convert a first satellite signal received and output a first intermediate signal (Lo_1), a second RF receiving circuit (120) configured to receive the reference clock (Clk_o), and down-convert a second satellite signal received and output a second intermediate signal (Lo_2), and a control unit (50) configured to control intermittent driving of the first RF receiving circuit (110) and the second RF receiving circuit (120), wherein the control unit (50) includes a first baseband processing circuit configured to receive the reference clock (Clk_o) and process the first intermediate signal (Lo_1), and a second baseband processing circuit configured to receive the sampling block and process the second intermediate signal. According to the fifth aspect, intermittent driving can be executed appropriately.

Supplementary Note 6

A control method of a satellite signal receiving device (10) according to a sixth aspect is a control method of a satellite signal receiving device (10) including a first receiving channel (11) configured to process a first satellite signal of a first GNSS, a second receiving channel (12) configured to process a second satellite signal of a second GNSS, a sampling clock outputting circuit (104) configured to receive a reference clock (Clk_o) and output a sampling clock (Clk_s), includes outputting a first intermediate signal (Lo_1), by a first RF receiving circuit (110) configured to perform intermittent driving in which an on operation and an off operation are repeated, when the first RF receiving circuit performs on operation, the first intermediate signal being obtained by down-converting the first satellite signal received by a first receiving antenna (111), processing, by a first baseband processing circuit (117), the first intermediate signal (Lo_1) in accordance with the reference clock (Clk_o), outputting a second intermediate signal (Lo_2), by a second RF receiving circuit (120) configured to perform the intermittent driving, when the second RF receiving circuit (121) performs on operation, the second intermediate signal being obtained by down-converting the second satellite signal received by a second receiving antenna, and processing, by a second baseband processing circuit (127), the second intermediate signal (Lo_2) in accordance with the sampling clock (Clk_s). According to the sixth aspect, intermittent driving can be executed appropriately.

Supplementary Note 7

An electronic apparatus according to a seventh aspect includes the satellite signal receiving device (10) according to any one of the first aspect to the fifth aspect. According to the seventh aspect, power consumption can be suppressed due to appropriate intermittent driving.

What is claimed is:

1. A satellite signal receiving device, comprising:
a first receiving channel configured to process a first satellite signal of a first GNSS;
a second receiving channel configured to process a second satellite signal of a second GNSS;
an oscillating circuit configured to generate a reference clock; and
a sampling clock outputting circuit configured to receive the reference clock, generate a sampling clock with a frequency of approximately 1/10 of the reference clock, and output the sampling clock, wherein
the first receiving channel includes:
  a first RF receiving circuit configured to perform intermittent driving in which an on operation and an off operation are repeated, and, during the on operation, down-convert the first satellite signal received by a first receiving antenna and output a first intermediate signal;
  a first dividing circuit configured to receive the reference clock, generate a first clock based on the reference clock, and output the first clock;
  a first PLL circuit configured to generate a first local signal in synchronization with a phase of the first clock, and output the first local signal;
  a first mixing circuit configured to generate the first intermediate signal based on the first satellite signal and the first local signal; and
a first baseband processing circuit configured to process the first intermediate signal in accordance with the reference clock,
the second receiving channel includes:
  a second RF receiving circuit configured to perform the intermittent driving, and, during the on operation, down-convert the second satellite signal received by a second receiving antenna and output a second intermediate signal;
  a second dividing circuit configured to receive the reference clock, generate a second clock based on the reference clock, and output the second clock;
  a second PLL circuit configured to generate a second local signal in synchronization with a phase of the second clock, and output the second local signal;
  a second mixing circuit configured to generate the second intermediate signal based on the second satellite signal and the second local signal; and
  a second baseband processing circuit configured to process the second intermediate signal in accordance with the sampling clock,
when a reception state of the first satellite signal at the first receiving channel is satisfactory, the first PLL circuit is turned on a power and the second PLL circuit is turned off a power,
when the reception state of the first satellite signal at the first receiving channel is not satisfactory, the first PLL circuit is turned off the power and the second PLL circuit is turned on the power, and
the sampling clock outputting circuit supplies the sampling clock to the second baseband processing circuit regardless of a power state of the second PLL circuit.

2. The satellite signal receiving device according to claim 1, wherein
even when the first RF receiving circuit is in the off operation, power of the first dividing circuit is not shut off, and
even when the second RF receiving circuit is in the off operation, power of the second dividing circuit is not shut off.

3. An electronic apparatus, comprising:
the satellite signal receiving device according to claim 1.

4. A satellite signal processing device, comprising:
a sampling clock outputting circuit configured to receive a reference clock, generate a sampling clock with a frequency of approximately 1/10 of the reference clock, and output the sampling clock, and output the sampling clock;

a first RF receiving circuit configured to receive the reference clock, and down-convert a first satellite signal received and output a first intermediate signal;

a second RF receiving circuit configured to receive the reference clock, and down-convert a second satellite signal received and output a second intermediate signal; and a control unit configured to control intermittent driving of the first RF receiving circuit and the second RF receiving circuit, wherein the first RF receiving circuit includes:
- a first dividing circuit configured to receive the reference clock, generate a first clock based on the reference clock, and output the first clock;
- a first PLL circuit configured to generate a first local signal in synchronization with a phase of the first clock, and output the first local signal; and
- a first mixing circuit configured to generate the first intermediate signal based on the first satellite signal and the first local signal, the second RF receiving circuit includes:
- a second dividing circuit configured to receive the reference clock, generate a second clock based on the reference clock, and output the second clock;
- a second PLL circuit configured to generate a second local signal in synchronization with a phase of the second clock, and output the second local signal; and
- a second mixing circuit configured to generate the second intermediate signal based on the second satellite signal and the second local signal, the control unit includes:
- a first baseband processing circuit configured to receive the reference clock and process the first intermediate signal; and
- a second baseband processing circuit configured to receive the sampling clock and process the second intermediate signal, when a reception state of the first satellite signal at the first receiving channel is satisfactory, the control circuit turns on power to the first PLL circuit and turns off power to the second PLL circuit, when the reception state of the first satellite signal at the first receiving channel is not satisfactory, the control circuit turns on power to the second PLL circuit and turns off power to the first PLL circuit, and the sampling clock outputting circuit supplies the sampling clock to the second baseband processing circuit regardless of a power state of the second PLL circuit.

5. A control method of a satellite signal receiving device, the control method comprising:
- generating a reference clock using an oscillating circuit;
- generating a sampling clock with a frequency of approximately $1/10$ of the reference clock using a sampling clock outputting circuit;
- generating a first clock based on the reference clock using a first dividing circuit;
- generating a first local signal in synchronization with a phase of the first clock using a first PLL circuit;
- receiving a first satellite signal of a first GNSS using a first antenna;
- during an on operation of intermittent driving, down-converting the first satellite signal using a first RF receiving circuit;
- generating a first intermediate signal based on the first satellite signal and the first local signal using a first mixing circuit;
- processing the first intermediate signal in accordance with the reference clock using a first baseband processing circuit;
- generating a second clock based on the reference clock using a second dividing circuit;
- generating a second local signal in synchronization with a phase of the second clock using a second PLL circuit;
- receiving a second satellite signal of a second GNSS using a second antenna;
- during an on operation of the intermittent driving, down-converting the second satellite signal;
- generating a second intermediate signal based on the second satellite signal and the second local signal using a second mixing circuit;
- processing the second intermediate signal in accordance with the sampling clock using a second baseband processing circuit;
- when a reception state of the first satellite signal at the first antenna is satisfactory, turning on power to the first PLL circuit and turning off power to the second PLL circuit;
- when the reception state of the first satellite signal at the first receiving antenna is not satisfactory, turning on power to the second PLL circuit and turning off power to the first PLL circuit; and
- supplying the sampling clock to the second baseband processing circuit from the sampling clock outputting circuit, regardless of a power state of the second PLL circuit.

* * * * *